United States Patent [19]

Smith

[11] 4,347,014
[45] Aug. 31, 1982

[54] HEMISPHERICAL BALL AND SOCKET JOINT

[75] Inventor: Joseph E. Smith, Birmingham, Mich.

[73] Assignee: Gulf & Western Manufacturing Company, Southfield, Mich.

[21] Appl. No.: 61,644

[22] Filed: Jul. 30, 1979

[51] Int. Cl.³ .............................................. F16C 11/06
[52] U.S. Cl. ...................................... 403/36; 403/125; 403/138
[58] Field of Search ............................... 403/122–138, 403/140, 144, 36

[56] References Cited

U.S. PATENT DOCUMENTS

| | | | |
|---|---|---|---|
| 843,004 | 2/1907 | Dock | 403/125 |
| 1,788,566 | 1/1931 | Dock | 403/125 |
| 2,569,823 | 10/1951 | Moskovitz | 403/132 |
| 2,885,248 | 5/1959 | White | 403/125 |
| 3,007,728 | 11/1961 | Hoffman | 403/132 |
| 3,173,344 | 3/1965 | Mongitore | 403/122 X |
| 3,370,872 | 2/1968 | Meyer | 403/125 |
| 3,374,016 | 3/1968 | Melton et al. | 403/125 |

FOREIGN PATENT DOCUMENTS

| | | | |
|---|---|---|---|
| 30245 | 12/1925 | France | 403/135 |
| 1050887 | 9/1953 | France | 403/124 |
| 1200343 | 7/1970 | United Kingdom | 403/133 |

*Primary Examiner*—Andrew V. Kundrat
*Attorney, Agent, or Firm*—Hauke and Patalidis

[57] ABSTRACT

A knuckle or swivel joint of the half-ball and socket type comprising a stud terminating in an enlarged diameter half-ball member disposed in the socket member and having a hemispherical recess engaged by the hemispherical convex surface of a retainer bearing member disposed in or, alternatively, made integral with the socket member. The retainer bearing member or, alternatively, a segment of the socket internal surface engaged with the half-ball peripheral surface is elastically pre-loaded in an appropriate direction which causes firm engagement of the diverse bearing surfaces in mutual contact, thus, among others, compensating for wear. The knuckle or swivel joint assembly of the invention is capable of transmitting substantial loads within a wide range of angular variations between the stud and the shank, or other member, rigidly connected to the socket.

14 Claims, 2 Drawing Figures

HEMISPHERICAL BALL AND SOCKET JOINT

BACKGROUND OF THE PRESENT INVENTION

The present invention relates to a bearing assembly for a knuckle or swivel joint, having improved load carrying capacity as compared to conventional half-ball and socket joints.

Knuckle or swivel joints of the half-ball and socket type are commonly used in motor vehicle steering tie rod assemblies, in drag links, torque rods and like structures, in which there is a requirement for transmitting a force from a member to another while permitting one member to swivel or pivot relative to the other.

Knuckle or swivel joints of the half-ball and socket type consist generally of a stud terminating in a partial ball disposed within a socket member in swivelling slidable engagement with a conforming concave spherical segment of the socket member. The engaged bearing surfaces of the half-ball and socket are often biased towards each other such as to provide a relatively tight assembly eliminating play and rattle and automatically compensating for wear of the bearing surfaces.

The shortcomings of conventional half-ball and socket joints are many. The load carrying capability of the joints is limited to the relatively small area of the peripheral surface of the half-ball engaged with the corresponding surface of the socket. A complex structure is required for providing pre-load of the bearing surfaces in arrangements where it is desired to prevent rattles and play, and to ensure automatic break-in and usage wear compensation. The amount of angulation between the elements interconnected by the joint and the load carrying characteristics of the assembly are limited.

SUMMARY OF THE INVENTION

The present invention remedies the inconveniences and shortcomings of the prior art by providing a knuckle or swivel joint structure which is a mechanical equivalent of conventional full-ball and socket joints but which is lighter in weight and therefore uses less material and which has fewer parts than generally required for knuckle or swivel joints for heavy-duty applications, such as truck or tractor tie rods, drag links, torque rods and the like. In addition, the present invention provides a knuckle or swivel joint which is able to handle large amounts of angular displacement between the joined elements, which has a tight fit between the bearing surfaces in mutual engagement, which is devoid of play and is rattle-proof, and which automatically compensates for break-in and usage wear.

The present invention accomplishes its many objects by way of a knuckle or swivel joint structure comprising a stud member terminating in an integral hollow half-ball head member whose peripheral spherical surfaces engages a conforming concave spherical surface of the corresponding socket member, the half-ball member having a substantially hemispherical concave cavity in which is engaged a hemispherical convex retainer bearing member holding the half-ball peripheral surface in swivelling sliding engagement with the socket spherical bearing surface. Pre-load of the bearing surfaces in engagement is effected by means of a resilient ring member urging the retainer bearing member towards the hemispherical cavity in the half-ball member or, alternatively, urging a segment of the socket spherical surface in engagement with the half-ball spherical peripheral surface.

Other objects and advantages of the present invention will become apparent to those skilled in the art when the following description of the best modes contemplated for practicing the invention is read in conjunction with the accompanying drawing wherein like numerals refer to like or equivalent parts and in which:

DETAILED DESCRIPTION OF THE PREFERRED EMBODIMENTS

Figure 1:
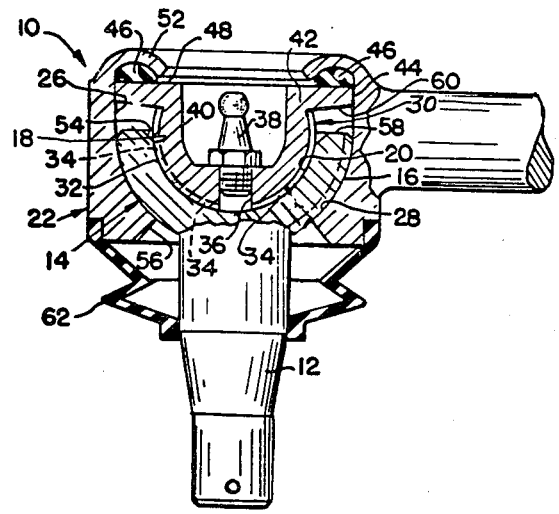
FIG. 1 is a side elevation view partly in section of an example of a knuckle or swivel joint according to the present invention.
Figure 2:
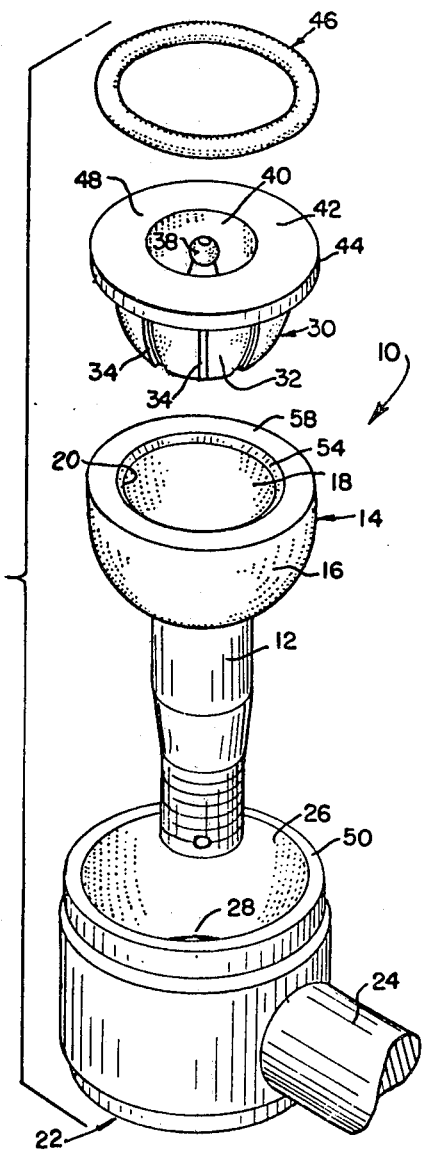
FIG. 2 is an exploded view of the structure of FIG. 1 prior to assembly of the components.

Referring to the drawings and more particularly to FIGS. 1-2, an example of structure for a knuckle or swivel joint 10 according to the present invention consists of a stud 12 provided at one end with an integral cold-headed half-ball 14 having a peripheral convex spherical surface 16 and a cavity or recess 18 provided with a concave hemispherical surface 20. In assembly, the half-ball 14 of the stud and half-ball integral unit is disposed within a socket member 22, FIG. 1, provided with a shank 24 fastened to the peripheral of the socket member by any convenient means, such as by friction welding, the socket member 22 having a bore 26 from which projects the stud 12. The peripheral convex spherical surface 16 of the half-ball 14 slidingly engages the inner concave spherical surface portion 28 of the socket 22 and is capable of swivelling relative thereto. A cup-shaped retainer bearing member 30, provided with a substantially hemispherical peripheral surface 32 conforming in dimension with the concave hemispherical surface 20 of the cavity or recess 18 in the half-ball 14, is disposed within the recess or cavity 18 such that the conforming hemispherical surfaces 20 and 32 are in swivelling sliding engagement with each other. The peripheral hemispherical surface 32 of the cup-shaped retainer bearing member 30 is, in the structure illustrated, provided with a plurality of lubrication grooves 34 formed along meridians of the peripheral hemispherical surface 32 and connected to a centrally disposed axial aperture 36, FIG. 1, in which is fitted a grease coupling 38. Because of the cup shape of the retainer bearing member 30, the grease fitting 38 is, in the structure illustrated, disposed at the bottom of a cavity 40, and is thus protected from impact with pebbles, stones, and other objects when the knuckle or swivel joint 10 of the invention is incorporated in the steering mechanism or drive mechanism of a heavy duty motor vehicle, agricultural tractor or the like. It will be appreciated that, if so desired, a removable dust cap may be fastened at the open end of the cavity 40 to protect the grease coupling 38, and that the grease coupling may be omitted in sealed bearing joint structures which are permanently lubricated or, in the alternative, which use bearing inserts of pre-lubricated porous metal, fabrics, or plastics, or plastic or other bearing inserts requiring no lubrication.

The cup-shaped insert or retainer bearing 30 has an annular flange 42 radially projecting outwardly around the open end of the cavity or recess 40, the peripheral edge of the annular flange 42 defining a cylindrical surface 44 fitting within the cylindrical portion of the bore 26 in the socket member 22. The cup-shaped insert or retainer bearing 30 is held within the hemispherical cavity 18 in the half-ball 14 by means of a toroidal or annular gasket 46 made of an appropriate elastomeric material compressively held against the annular end face 48 of the flange 42 of the cup-shaped insert or retainer bearing 30 when, after assembly of the elements as illustrated at FIG. 1, the elements are maintained in assembled position as the result of swaging the rim 50, FIG. 2, of the socket member 22 radially as illustrated at 52 at FIG. 1.

It will be appreciated that all the spherical surfaces of the element forming the knuckle or swivel joint 10 of the invention are concentric, that is the socket spherical segment surface 28, the half-ball peripheral surface 16, the half-ball internal hemispherical surface 20 and the insert or retainer peripheral spherical surface 32 are concentric with one another. The half-ball internal hemispherical surface 20 is provided at its edge with a short chamfer 54 for the purpose of providing adequate clearance for extreme angulation between the shank 24 and the stud 12. The permissible angulation of the half-ball 14 relative to a diametrical plane of the socket member 22 is generally limited by abutment of a portion of the peripheral surface of the stud proximate the half-ball 14 with a chamfered edge 56, FIG. 1, of the socket member 22, and/or by engagement of the annular end face 58 of the half-ball 14 with an annular face 60 formed below the flange 42 of the insert or retainer bearing 30. A flexible bellows 62, FIG. 1, shields from dirt the peripheral portion of the stud 12 which is proximate the half-ball 14 and the exposed portion of the spherical peripheral surface 16 of the half-ball while at rest or during angulation of the stud 12 relative to the shank 24.

When, at the end of the assembly of the diverse components of the joint 10, the rim 50, FIG. 2, of the socket member 20 is swaged over the annular or toroidal elastomeric gasket 46, the gasket 46 is compressed and expands outwardly so as to form an efficient seal preventing introduction of dirt through the open end of the socket bore 26. At the same time, the compressed resilient gasket 46 is caused to act as a biasing means exerting a force upon the annular end surface 48 of the insert or retainer bearing 30, such biasing force being carefully tailored as a function of the amount of bend imposed on the socket rim 50 during swaging, the radius of the bend, the size, shape, and elastomeric characteristics of the material used for making the toroidal or annular gasket 46. The biasing force exerted by the compressed toroidal or annular elastomeric gasket 46 urges the concentric spherical surfaces of the diverse elements in contact with one another, thus preventing rattling, looseness or play between the elements, and automatically compensating for break-in and usage wear.

As previously mentioned, the stud 12 and the half-ball 14 are cold-headed, and very little machining, if any, is required on the peripheral spherical surface 16 of the half-ball or upon its concave hemispherical internal surface 18. The socket member 22 is preferably a cold forging and requires machining only at its internal surface portion provided with a concave spherical surface 28. The cup-shaped insert or retainer bearing 30 may consist of a cold forging or heavy stamping. A small weight of steel is used as all the elements, including the half-ball 14, are hollow and may be provided with walls as thin as permissible for the load to be carried by the joint.

Figure 3:
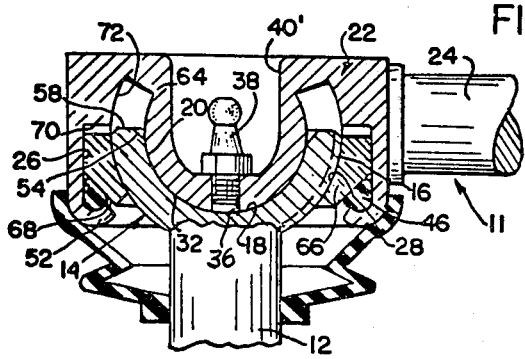
FIG. 3 is a view similiar to FIG. 1, but showing a modification thereof.

Referring now to FIG. 3, there is illustrated another example of structure for a swivel or knuckle joint 11 according to the present invention which comprises a stud 12 provided with a hollow half-ball 14, both substantially alike in form and structure to those previously explained in detail. The socket member 22 is provided with an integral centrally disposed inverted dome portion 64 having a hemispherical peripheral surface 32 in engagement with the concave hemispherical surface 18 of the half-ball 14. A spherical segment annular insert 66 is retained in the bore 26 of the socket member 22, and the spherical segment insert 66 has a concave spherical surface 28 slidably engaging the peripheral spherical surface 16 of the half-ball 14. The spherical segment insert 66 has an annular chamfered surface 68 engaged with a compressed elastomeric annular or toroidal gasket 46, compressively held against the annular chamfered surface 68 by the swaged edge 52 of the socket bore 26. The bore 26 of the socket member 22, preferably, has an annular shoulder 70 formed between the bore 26 of larger diameter and a portion 72 of the bore of smaller diameter, the annular shoulder 70 participating in limiting the permissible motion of the spherical segment insert 66. The reduced diameter portion 72 of the bore may be somewhat relieved for permitting projection therein of the annular end face 58 of the half-ball 14 without interfering during extreme angulation of the ball stud 12 relative to the socket shank 24, or it may be shaped generally convexly spherical, as illustrated. Preferably, but not necessarily so, the inverted dome portion 64 of the socket member 22 is provided with a cavity 40' for lighter weight and for easier forging, a grease-fitting 38 being conveniently disposed at the bottom of the recess or cavity 40' for appropriate protection, in structures wherein it is desired to provide for occasional lubrication of the joint.

It will be appreciated that in the structure of knuckle or swivel joint 11 illustrated at FIG. 3, the pre-load exerted by the compression of the toroidal or annular gasket 46 urges all the concentric spherical surfaces in engagement towards each other, and results in a substantially tight assembly which automatically compensates for wear of the surfaces in swivelling sliding engagement.

Figure 4:
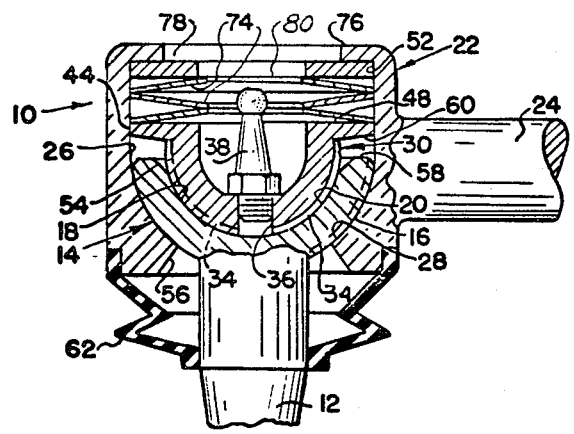
FIGS. 4, 5 and 6 are views similar to FIG. 1 but showing further modifications thereof.

It will be further appreciated that other means than an elastomeric annular or toroidal member may be used for biasing the spherical surfaces in engagement with each other. An example of alternate structural arrangement is illustrated at FIG. 4 which shows a knuckle or swivel joint 10 according to the present invention that is identical to the structure illustrated at FIG. 1, with the exception that the elastomeric annular or toroidal gasket member has been replaced by a plurality of superimposed dished spring washers 74, or Belleville springs, compressively disposed between the annular end face 48 of the hemispherical insert or retainer bearing 30 and a retainer ring 76 held in position at the open end of the socket bore 26 by swaging, as shown at 52, or by any other means as press-fitting, threading or the like. Because the retainer ring 76 and the Belleville spring 74 have, respectively, aligned central openings 78 and 80, access to the grease fitting 38 is thus provided in structures where lubrication of the knuckle or swivel joint is desired. A dust cap, not shown, may be provided for hermetically closing the opening 78 in the retainer ring 76.

Figure 5:
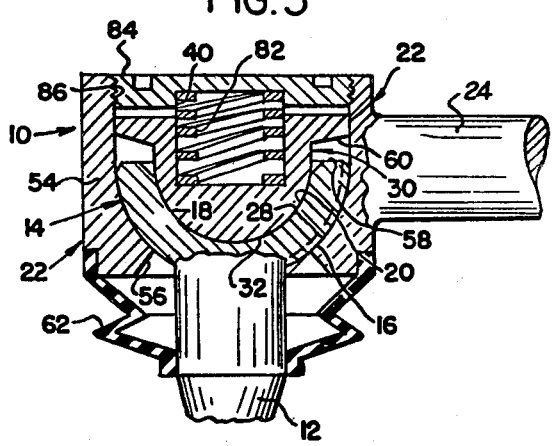

FIG. 5 illustrates a further modification of structure according to the invention wherein the elastomeric annular or toroidal member 46 of FIG. 1, or the Belleville-type springs 74 of FIG. 4, has been replaced by a coil spring 82 disposed within the cavity or recess 40 in the hemispherical insert or retainer bearing 30, the coil spring 82 being held under compression by means of a closure cap 84 threadably engaged in a thread 86 formed within the socket bore 26 at the end thereof. The knuckle or swivel joint 10 illustrated at FIG. 5 is of the permanently lubricated or pre-lubricated type, and if it is desired to provide a unit which cannot be taken apart, the retainer cap 84 may be held in position by press-fitting or by swaging over the open end of the socket member 22.

Figure 6:
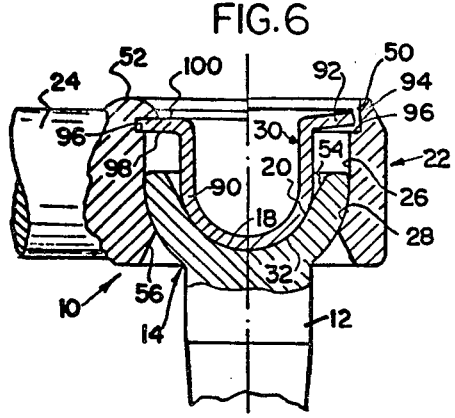

FIG. 6 represents a simplified structure for a knuckle or swivel joint 10 according to the present invention in which the hemispherical insert or retainer bearing 30 is in the form of a relatively thin cup 90 having an integral outwardly extending frusto-conical, or dished flange 92. The cup 90, including the integral flange 92, is preferably a stamping drawn from sheet steel, and has a hemispherical surface 32 engaged with the concave hemispherical surface 20 of the half-ball member 14. During assembly of the joint 10, the cup 90 is disposed in the position indicated at the right-hand half of FIG. 6, with the dished flange 92 extending in an enlarged portion 94 of the socket bore 26, an annular step 96 being disposed between the bore 26 and the enlarged portion 94 of the bore. After swaging the rim 50 of the socket 22, as illustrated at 52 at the left-hand portion of FIG. 6, the lower surface 98 of the flange 92 is caused to engage, proximate its edge, the annular surface 96, thus flattening the dished flange 92 to a substantially planar annular flange, as shown at 100, with the result that the hemispherical surface 32 of the cup 90 is firmly engaged with the corresponding concave hemispherical surface 20 of the ball recess or cavity 18. The amount of pre-load of the concentric spherical surfaces in engagement with each other is a function of the spring characteristics of the material used for drawing the cup 90, the wall thickness of the cup 90 and of the flange 92, and the amount of deflection of the dished flange 92 when it is flattened to its substantially uniplanar condition illustrated at 100 during swaging of the socket rim 50 to the condition illustrated at 52.

Figure 7:
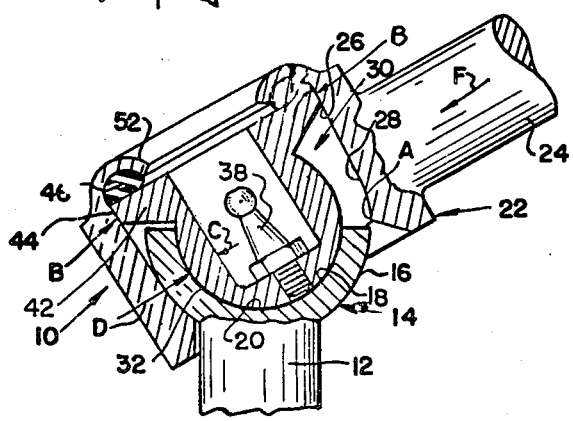
FIG. 7 is a schematic view showing a structure substantially alike the structure of FIG. 1, with the elements connected by the joint disposed at a substantial angle relative to each other.

The knuckle or swivel joints of the invention present the advantage, over conventional half-ball and socket joints, of being capable of transmitting a considerable load from the stud member to the shank member, and vice versa, even under substantial angulation of one member relative to the other, as for example illustrated at FIG. 7. At extreme angulation, even though a force may be applied as shown arbitrarily by arrow F along the axis of the shank member 24, and the area A of the socket spherical surface 28 is no longer engaged with the peripheral spherical surface 16 of the half-ball 14, the force is transmitted to the peripheral surface 44 of the flange 42 of the insert or retainer bearing 30 where it engages the surface of the bore 26 in the socket member 22, as arbitrarily shown at arrow B, and from the peripheral hemispherical surface 32 of the insert or retainer bearing 30 to the inner concave hemispherical surface 18 of the half-ball 14, as arbitrarily represented by the arrows C and D.

It will also be readily apparent that the knuckle or swivel joint structure 11 of FIG. 3 has also considerable load carrying characteristics at extreme angulation, as the load applied to the shank 24 is transmitted directly to the integral inverted dome-shaped member 64.

Having thus described the invention by way of typical structural embodiments thereof, modification whereof will be apparent to those skilled in the art, what is claimed as new is as follows:

1. A ball joint structure comprising a stud and a half-ball member integrally formed at one end of said stud, a peripheral spherical surface on said half-ball member and a recess in the end of said half-ball member having a concave substantially hemispherical surface, said peripheral spherical surface and said concave hemispherical surface being substantially concentric with each other, a socket member having a concave spherical surface engaged with the peripheral spherical surface of said half-ball member, a cup-shaped retainer member having a substantially hemispherical peripheral surface concentric to and engaged with said concave hemispherical surface in the recess of said half-ball, a grease fitting disposed at the bottom of said cup-shaped retainer member, biasing means urging said concentric spherical surfaces in mutual swiveling sliding engagement, and means holding said biasing means.

2. The ball joint structure of claim 1 wherein said biasing means applies a force directly to said cup-shaped retainer member.

3. The ball joint structure of claim 2 wherein said biasing means comprises an elastomeric annular member, and said retainer member has an end flange engaged by said elastomeric annular member.

4. The ball joint structure of claim 1 wherein said biasing means comprises said cup-shaped retainer member having an outwardly extending end flange, and means applying a force upon said flange for elastically deforming said flange.

5. The ball joint structure of claim 1 wherein said concave spherical surface in said socket member is in the form of a separate annular segment, and said biasing means applies a force on said annular segment urging said concentric spherical surfaces in mutual engagement.

6. The ball joint structure of claim 5 wherein said cup-shaped retainer member is integrally formed at an end of said socket member.

7. The ball joint structure of claim 1 wherein said biasing means is held by swaging an edge of said socket member.

8. The ball joint structure of claim 3 wherein said elastomeric annular member is held by swaging an edge of said socket member.

9. The ball joint structure of claim 4 wherein said end flange is deformed by swaging an edge of said socket member.

10. The ball joint structure of claim 5 wherein said biasing means comprises an elastomeric annular member held by swaging an edge of said socket member.

11. A ball joint structure comprising a stud and a half-ball member integrally formed at one end of said stud, a peripheral spherical surface on said half-ball member and a recess in the end of said half-ball member having a concave substantially hemispherical surface, said peripheral spherical surface and said concave hemispherical surface being substantially concentric with each other, a socket member having a concave spherical surface engaged with the peripheral spherical surface of said half-ball member, a cup-shaped retainer member having a substantially hemispherical peripheral surface concentric to and engaged with said concave hemispherical surface in the recess of said half-ball, biasing means urging said concentric spherical surfaces in mutual swiveling sliding engagement, and means holding said biasing means, wherein said concave spherical surface in said socket member is in the form of a separate annular segment, said biasing means applies a force on said annular segment urging said concentric spherical surfaces in mutual engagement, and said biasing means comprises an elastomeric annular member held by swaging an edge of said socket member.

12. The ball joint structure of claim 11 wherein said cup-shaped retainer member is integrally formed at an end of said socket member.

13. A ball joint structure comprising a stud and a half-ball member integrally formed at one end of said stud, a peripheral spherical surface on said half-ball member and a recess in the end of said half-ball member having a concave substantially hemispherical surface, said peripheral spherical surface and said concave hemispherical surface being substantially concentric with each other, a socket member having a concave spherical surface engaged with the peripheral spherical surface of said half-ball member, a cup-shaped retainer member having a substantially hemispherical peripheral surface concentric to and engaged with said concave hemispherical surface in the recess of said half-ball, an annular end flange on said cup-shaped retainer member, biasing means urging said concentric spherical surfaces in mutual swiveling sliding engagement, said biasing means comprising an elastomeric annular member held directly in compression between said retainer annular end flange and a swaged edge of said socket member.

14. A ball joint structure comprising a stud and a half-ball member integrally formed at one end of said stud, a peripheral spherical surface on said half-ball member and a recess in the end of said half-ball member having a concave substantially hemispherical surface, said peripheral spherical surface and said concave hemispherical surface being substantially concentric with each other, a socket member having a concave spherical surface engaged with the peripheral spherical surface of said half-ball member, a cup-shaped retainer member having a substantially hemispherical peripheral surface concentric to and engaged with said concave hemispherical surface in the recess of said half-ball, biasing means urging said concentric spherical surfaces in mutual swiveling sliding engagement, wherein said biasing means comprises said cup-shaped retainer member having a longitudinal axis and an outwardly extending end flange disposed at an oblique angle to said axis, said end flange being elastically deformed to lie in a plane substantially perpendicular to said axis by swaging an edge of said socket member during assembly of said ball joint structure.

* * * * *